United States Patent
Lambright et al.

(10) Patent No.: US 6,457,102 B1
(45) Date of Patent: Sep. 24, 2002

(54) CACHE USING MULTIPLE LRU'S

(75) Inventors: Daniel Lambright, Waltham; Adi Ofer, Wellesley; Natan Vishlitzky, Brookline; Yuval Ofek, Framingham, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/434,611

(22) Filed: Nov. 5, 1999

(51) Int. Cl.[7] .............................................. G06F 12/08
(52) U.S. Cl. ........................ 711/129; 711/131; 711/152
(58) Field of Search ................................. 711/145, 129, 711/132, 130, 118, 153, 173, 131, 152

(56) References Cited

U.S. PATENT DOCUMENTS

| | | | |
|---|---|---|---|
| 4,371,929 A | 2/1983 | Brann et al. | 710/45 |
| 5,206,939 A | 4/1993 | Yanai et al. | 711/4 |
| 5,778,394 A | 7/1998 | Galtzur et al. | 707/205 |
| 5,822,764 A | * 10/1998 | Hardage, Jr. et al. | 711/145 |
| 5,845,147 A | 12/1998 | Vishlitzky et al. | 710/5 |
| 5,857,208 A | 1/1999 | Ofek | 707/204 |
| 6,115,790 A | * 9/2000 | Schimmel | 711/119 |
| 6,173,367 B1 | * 1/2001 | Aleksic et al. | 711/129 |

FOREIGN PATENT DOCUMENTS

| | | |
|---|---|---|
| EP | 0497543 A2 | 8/1992 |
| WO | WO9201988 A | 2/1992 |

OTHER PUBLICATIONS

"Cache memories quicken access to disk data"; 2328 Electronic Design; vol. 30(1982) May, No. 10, Waseca, MN Denville, NJ "Systems and Software".

* cited by examiner

*Primary Examiner*—Hiep T. Nguyen
(74) *Attorney, Agent, or Firm*—Hutchins, Wheeler & Dittmar (57) ABSTRACT

Storing data in a cache memory includes providing a first mechanism for allowing exclusive access to a first portion of the cache memory and providing a second mechanism for allowing exclusive access to a second portion of the cache memory, where exclusive access to the first portion is independent of exclusive access to the second portion. The first and second mechanisms may be software locks. Allowing exclusive access may also include providing a first data structure in the first portion of the cache memory and providing a second data structure in the second portion of the cache memory, where accessing the first portion includes accessing the first data structure and accessing the second portion includes accessing the second data structure. The data structures may doubly linked ring lists of blocks of data and the blocks may correspond to a track on a disk drive. The technique described herein may be generalized to any number of portions.

27 Claims, 5 Drawing Sheets

CACHE USING MULTIPLE LRU'S

BACKGROUND OF THE INVENTION

1. Field of the Invention

This application relates to the field of computer data storage and more particularly to the field of configuring a cache in a computer data storage system having multiple processors accessing the cache.

2. Description of Related Art

Host processor systems may store and retrieve data using a storage device containing a plurality of host interface units, disk drives, and disk interface units. Such storage devices are provided, for example, by EMC Corporation of Hopkington, Mass. and disclosed in U.S. Pat. No. 5,206,939 to Yanai et al., 5,778,394 to Galtzur et al., U.S. Pat. No. 5,845,147 to Vishlizzky et al., and U.S. Pat. No. 5,857,208 to Ofek. The host systems access the mass storage device through a plurality of channels provided therewith. Host systems provide data and access control information through the channels to the storage device and storage device provides data to the host systems also through the channels. The host systems do not address the disk drives of the storage device directly, but rather, access what appears to be the host systems as a plurality of logical disk units. The logical disk units may or may not correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently is removed from the cache to make room for new data. Often such cache accesses are transparent to the host system requesting the data.

One technique for implementing a cache is to store the data in blocks and link each of the blocks together in a doubly linked ring called a logical ring unit (LRU). Each block of the LRU represents a block of data from a logical disk unit. The blocks are placed in the doubly linked ring list in the order in which they are retrieved from the disk. A pointer points to the block that was most recently added to the list. Thus, when a new block is to be added to the cache, the structure of the LRU in combination with the head pointer may be used to determine the oldest block in the LRU that is to be removed to make room for the new block.

A drawback with the LRU mechanism discussed above is that only one process may access and manipulate the ring list at a time since the complexity of the doubly linked ring structure makes it difficult to allow more than one process manipulate to the data structure at any time. One way to enforce this is to use a software lock, which is a conventional semaphore-like mechanism that allows a process exclusive access to the LRU. However, when multiple processors need to use the cache, then this exclusive LRU access policy may become a bottleneck.

SUMMARY OF THE INVENTION

According to the present invention, storing data in a cache memory includes providing a first mechanism for allowing exclusive access to a first portion of the cache memory and providing a second mechanism for allowing exclusive access to a second portion of the cache memory, where exclusive access to the first portion is independent of exclusive access to the second portion. Storing data in a cache memory may also include providing at least a third mechanism for allowing exclusive access to at least a third portion of the cache memory where exclusive access to any one of the portions is independent of exclusive access to any other ones of the portions. The first and second mechanisms may be locks. The locks may be software locks or hardware locks. Allowing exclusive access may also include providing a first data structure in the first portion of the cache memory and providing a second data structure in the second portion of the cache memory, where accessing the first portion includes accessing the first data structure and accessing the second portion includes accessing the second data structure. The data structures may doubly linked ring lists of blocks of data and the blocks may correspond to a track on a disk drive. Allowing exclusive access may also include determining a first cache fall through time for the first portion, determining a second cache fall through time for the second portion, and assigning data to one of the first and second portions according to the first and second cache fall through times. Allowing exclusive access may also include determining a difference between the first and second cache fall through times, wherein assigning data to one of the first and second portions is based on the difference. In response to the difference being less than a predetermined amount, data may be assigned randomly to one of the first and second portions.

According further to the present invention, a cache memory includes a first portion having a first mechanism for allowing exclusive access thereto and a second portion having a second mechanism for allowing exclusive access thereto, where exclusive access to the first portion is independent of exclusive access to the second portion. The first and second mechanisms may be software locks. The first portion may include a first data structure and the second portion may include a second data structure and accessing the first portion may include accessing the first data structure and accessing the second portion may include accessing the second data structure. The data structures may be doubly linked ring lists of blocks of data. Each block of data may correspond to a track on a disk drive. A first cache fall through time for the first portion may be determined, a second cache fail through time for the second portion may be determined, and data may be assigned to one of the first and second portions according to the first and second cache fall through times. A difference between the first and second cache fall through times may be determined and assigning data to one of the first and second portions may be based on the difference. In response to the difference being less than a predetermined amount, data may be assigned randomly to one of the first and second portions.

According further to the present invention, a storage device includes a plurality of disk drives, a plurality of disk interface units, each being coupled to one of the disk drives, a bus that interconnects the disk interface units, and a cache memory, coupled to the bus, the cache memory having a plurality of portions, each being independently controllable by one of the disk interface units. Each of the portions of the cache memory may have a mechanism for controlling exclusive access thereto. Each of the portions may include a data structure and accessing one of the portions may include accessing a corresponding one of the data structures. The data structures may be doubly linked ring lists.

According further to the present invention, a cache memory, includes a plurality of portions and a plurality of locks, each of the locks corresponding to exclusive access to a particular one of the portions, where exclusive access to one of the portions is independent of exclusive access to another one of the portions. Each of the portions may include a data structure and accessing one of the portions may include accessing the data structure. The data structure may be a doubly linked ring lists of blocks of data. Each block of data may correspond to a track on a disk drive.

DETAILED DESCRIPTION OF THE PREFERRED EMBODIMENT(S)

Figure 1:
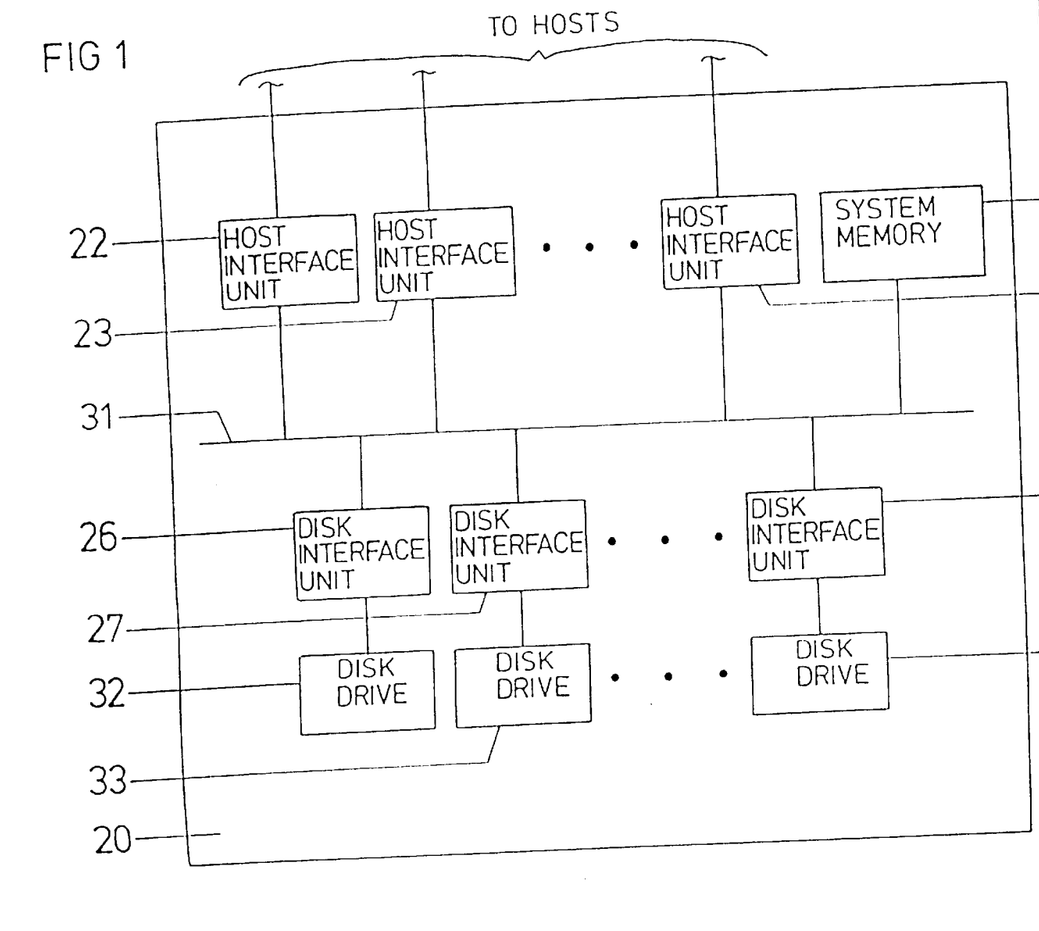
FIG. 1 is a schematic diagram of a system that uses the present invention.

Referring to FIG. 1, a data storage device 20 includes a plurality of host interface units 22–24, a plurality of disk interface units 26–128, and a plurality of disk drives 32–34, each of which is coupled to a respective one of the disk interface units 26–28. The host interface units 22–24 may be coupled to one or more external host systems (not shown), such as a computer that reads and writes data to a disk drive system.

The storage device 20 may perform operations that would otherwise be performed by a conventional disk drive system connected to each of the host systems. Thus, the storage device 20 receives disk commands via the host interface units 22–24 and provides disk data, from the disk drives 32–34, to the host systems through the host interface units 22–24. However, the host systems connected to the storage device 20 do not access the disk drives 32–34 directly, but rather, the host systems access the storage device 20 by requesting use of one or more logical disks. The storage device 20 translates requests from the hosts for access to particular logical disks into physical locations on the disk drives 32–34. A bus 31 provides communication between the host interface units 22–24 and the disk interface units 26–28.

A request from a host is provided through one of the host interface units 22–24 in the form of a logical disk number, cylinder number, and track number. That is, a host reads or writes data by specifying the logical disk number, cylinder number, and track number. This request passes through the respective one of the host interface units 22–24 to the appropriate one of the disk interface units 26–28 which then accesses the data on the appropriate one on the disk drives 32–34 and provides the data to the appropriate one of host interface units 22–24.

In some instances, it may be more efficient to reduce the number of physical disk accesses made to the disk drives 32–34 by caching some of the data that is requested. For that purpose, a system memory 36 is coupled to the bus 31 and, as described in more detail hereinafter, provides storage for caching data that is transferred between the disk drives 32–34 and the host interface units 22–24. Each of the disk interface units 26–28 contains a processor and runs processes that directly access the system memory 36. Thus, as described in more detail below, using the system memory 36 for caching necessitates use of techniques that inhibit problems that may occur if two or more processes attempt to access critical data simultaneously.

Figure 2:
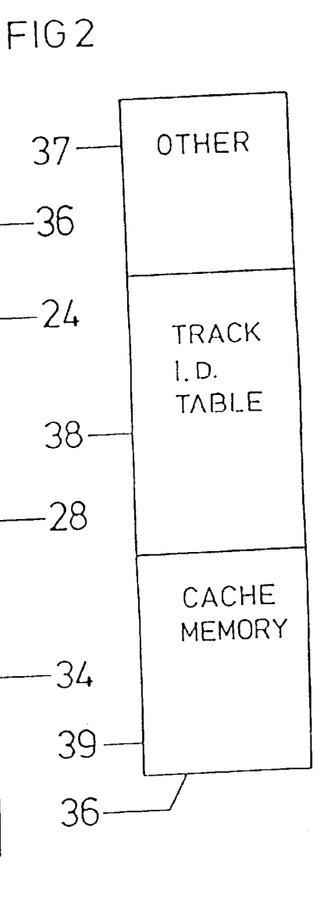
FIG. 2 is a detailed schematic diagram showing the memory of the system of FIG. 1.

Referring to FIG. 2, a schematic diagram shows the system memory 36 in more detail. The system memory includes other memory 37 (containing other system data components not discussed herein), a track i.d. table 38, and a cache memory 39. The cache memory 39, and structure thereof, is discussed in more detail hereinafter. The track i.d. table 38 is a table that contains an entry for each and every one of the tracks on the disk drives 32–34. The entry for each of the tracks indicates whether the particular track is in the cache memory 39 and, if so, if the data in cache memory has been written to but not yet copied back to the disk drives 32–34. The track i.d. table 38 is thus used to implement a somewhat conventional direct mapped cache system where, for every disk memory location, there is a corresponding indicator denoting whether the data is in the cache.

Figure 3:
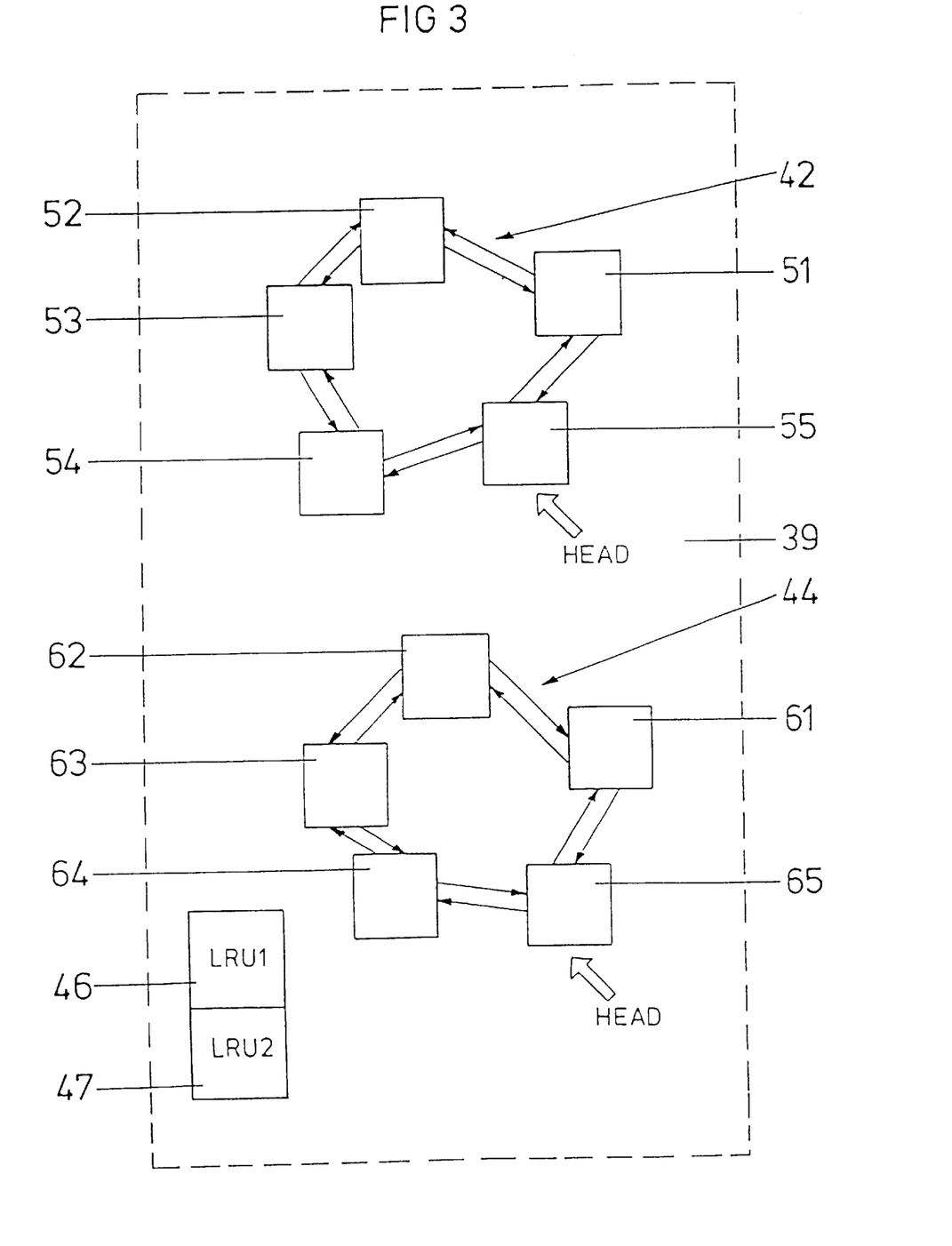
FIG. 3 is a detailed schematic diagram showing the data stored in cache memory according to the present invention.

Referring to FIG. 3, a schematic diagram shows the cache memory 39 in more detail. The cache memory includes a first logical ring unit (LRU) 42 and a second LRU 44. The cache memory 39 also includes first and second software LRU locks 46,47 which are discussed in more detail hereinafter.

Note that although the exemplary embodiment shown herein uses the two LRU's 42, 44, it will be appreciated by one of ordinary skill in the art that the system described herein may be generalized to any number of LRU's. In fact, the technique may be further generalized to work with any number of portions of the cache memory 39.

The LRU 42 is made up of a plurality of memory blocks 51–55, each of which may correspond to a track on one of the disk drives 32–34. Each of the blocks 51–55 may corresponds to a slot of the cache memory 39, where a slot simply refers to a section of the cache memory 39 used for one of the blocks 51–55. In addition, a "slot number" may be used to refer to a particular one of the blocks 51–55, where the slots are numbered sequentially, starting at zero, according to the relative location thereof in the cache memory 39. Thus, the slot having the lowest memory address could be slot zero, the slot having the next highest memory address could be slot one, etc.

In one embodiment, each of the tracks of the disk drives 32–34, and in each of the memory blocks 51–55, contains 50,368 bytes of memory. However, it will be appreciated by one of ordinary skill in the art that the sizes may vary. In addition, it will be appreciated by one of ordinary skill in the art that the system described herein may be adapted so that the size of each of the blocks 51–55 does not necessarily correspond to the size of each of the tracks of the disk drives 32–34. For example, each of the blocks 51–55 may be a multiple of the track size or may be a fraction of the track size.

The second LRU 44 also contains a plurality of memory blocks 61–65 that are analogous to the memory blocks 51–55 of the first LRU 42. The LRU 42 includes a head pointer that points to the block 55 which was most recently added to the LRU 42. Similarly, the LRU 44 also includes a head pointer that points to the block 65 that was most recently added to the LRU 44.

The processors on any one of the disk interface units 26–28 may manipulate either the first LRU 42 or the second LRU 44 to, for example, add a block thereto or remove a block therefrom. Since each of the LRUs 42, 44 is constructed as a doubly linked ring list (a relatively complex data structure) only one processor at a time is allowed access to one of the LRUs 42, 44 at a time. This is accomplished by using the software locks 46,47 which are a type of conventional semaphore that allows a processor to obtain exclusive access to one of the LRUs 42, 44, thus inhibiting simultaneous access. In one embodiment, a processor of one of the disk interface units 26–28 that desires access to one of the LRUs 42, 44 first locks the memory hardware using a conventional hardware memory lock, to prevent access to the software locks 46, 47. Once the hardware lock has been accomplished, the processor that desires access then obtains one of the software locks 46, 47, after which the hardware lock may be released. Note that the software lock 46 may be used for the LRU 42 while the software lock 47 may be used for the LRU 44.

A feature of the system described herein is that it is possible for one of the disk interface units 26–28 to have access to, for example, the first LRU 42 while another one of the disk interface units 26–28 simultaneously has access to the second LRU 44. Thus, two processors may simultaneously have access to the LRUs 42, 44. Allowing simultaneous access reduces the instances of processors waiting for access to the cache. Simultaneous access by two processors to the LRUs 42, 44 is possible because each of the LRUs 42, 44 is a standalone data structure that is not affected by modifications to the other data structure. Thus, manipulation of the linked ring list of the LRU 42 does not affect the linked ring list of the LRU 44. Note that, in some embodiments, it may be useful from time to time to lock the entire cache memory 39 by accessing and holding each of the software locks 46,47 until all of the LRU's 42, 44 are locked.

Each time access to data is requested by one of the hosts, the track i.d. table 38 is examined to determine if the data is already in the cache memory 39. If the data is already in the cache memory 39, then the cache memory 39 is accessed rather than accessing the disk drives 32–34. In the case of a read operation, this may be performed by the host interface units 22–24 as well as by the disk interface units 26–28. Otherwise, if the requested data is not already in the cache memory 39, it is fetched and placed in the cache memory 39. In that case, the block associated with the data is assigned to one of the LRUs 42, 44, in a manner described in more detail hereinafter.

In some embodiments, the slot number is used to determine which of the LRU's 42,44 contains particular data. For example, in a system with two LRU's, it is possible to have the odd slot numbers correspond to one of the LRUs and have the even slot numbers correspond to the other one of the LRU's. For a system with N LRU's, a slot number may be mapped to a particular LRU using the formula (slot number) mod N. This technique provides a convenient mechanism for determining which LRU contains particular data, since the track I.D. table 38 indicates where in the cache memory 39 particular data exists, and this information may be used to determine a slot number, which maps to a particular LRU.

Figure 4A:
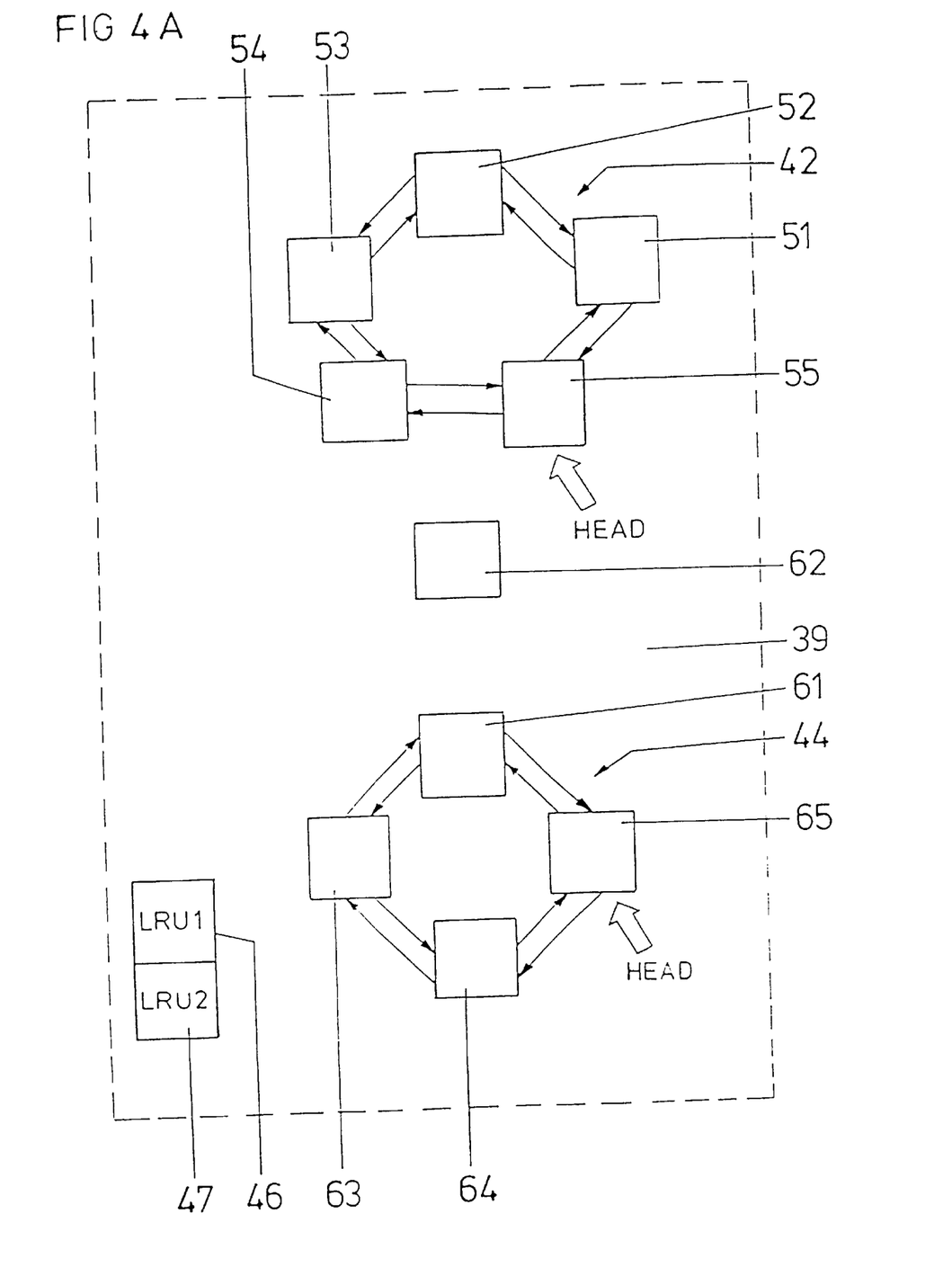
FIGS. 4A and 4B show the handling of a modified block of data in cache memory according to the present invention.
Figure 4B:
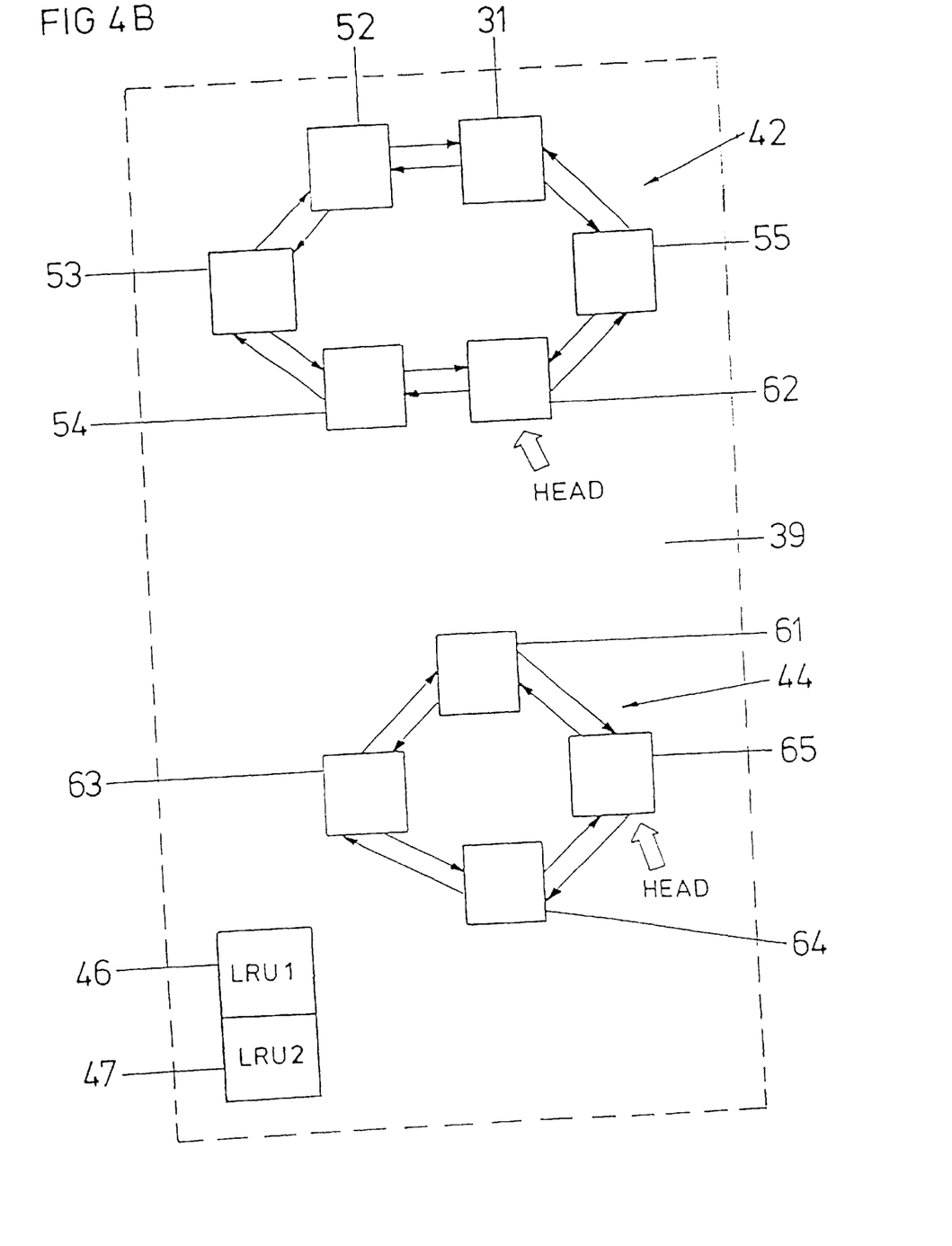

Referring to FIGS. 4A and 4B, the process for modifying a block in the cache 39 is illustrated. When a host connected to the system 20 modifies data that is stored in the cache 39, the host sends a disk write command through the appropriate one of one of the host interface units 22–24. If the track of the disk drive 32–34 that is being written to is in the cache 39 then the block that is being written to, in the example of FIGS. 4A and 4B the block 62, is first removed from the LRU 44 to protect the block 62 from being manipulated by another process during the write operation. When the block 62 is removed for a write operation, the corresponding entry in the track i.d. table 38 is modified to indicate the write operation. Once the block 62 has been removed from the LRU 44, the software lock 47 for the second LRU 44 is released so that other processes may modify the second LRU 44. Once the block 62 has been separated from the second LRU 44, the block 62 may be modified using data provided by one of the host interface units 22–24. Following modification, the data from the block 62 is copied back to the track of the disk drives 32–34 corresponding to the block 62.

As shown in FIG. 4B, once the block 62 is copied to the disk drives 32–34, the block 62 is returned back to one of the LRUs 42, 44. In the example shown in FIG. 4B, the block 62 is returned to the first LRU 42 rather than back to the second LRU 44. In other embodiments, the block 62 would always be returned to the LRU 44 and, generally, once a block is assigned to a particular LRU, it is not moved.

Each time a new block is added to the cache 39, and each time a block is returned to a particular one of the LRU's 42,44 after a write operation, the block is assigned to a particular one of the LRUs 42, 44. In one embodiment, the assignment of a block to a particular one of the LRUs 42, 44 is made by taking a random or pseudo random number, such as the wall clock time modulo the number of LRUs 42, 44 which, in this case, is two. Thus, a block that is modified such as the block 62 illustrated in FIGS. 4A and 4B, or a new block that is accessed from the disks 32–34, is assigned a particular one of the LRUs 42, 44 in a random manner, thus providing a mechanism for balancing the number of blocks in the LRUs 42, 44. Note that, in instances where the slot number is mapped to the LRU, then once the particular LRU for a block has been assigned, it may be possible to pick a particular slot (and thus slot number) to cause the block to be placed on the assigned LRU.

Figure 5:
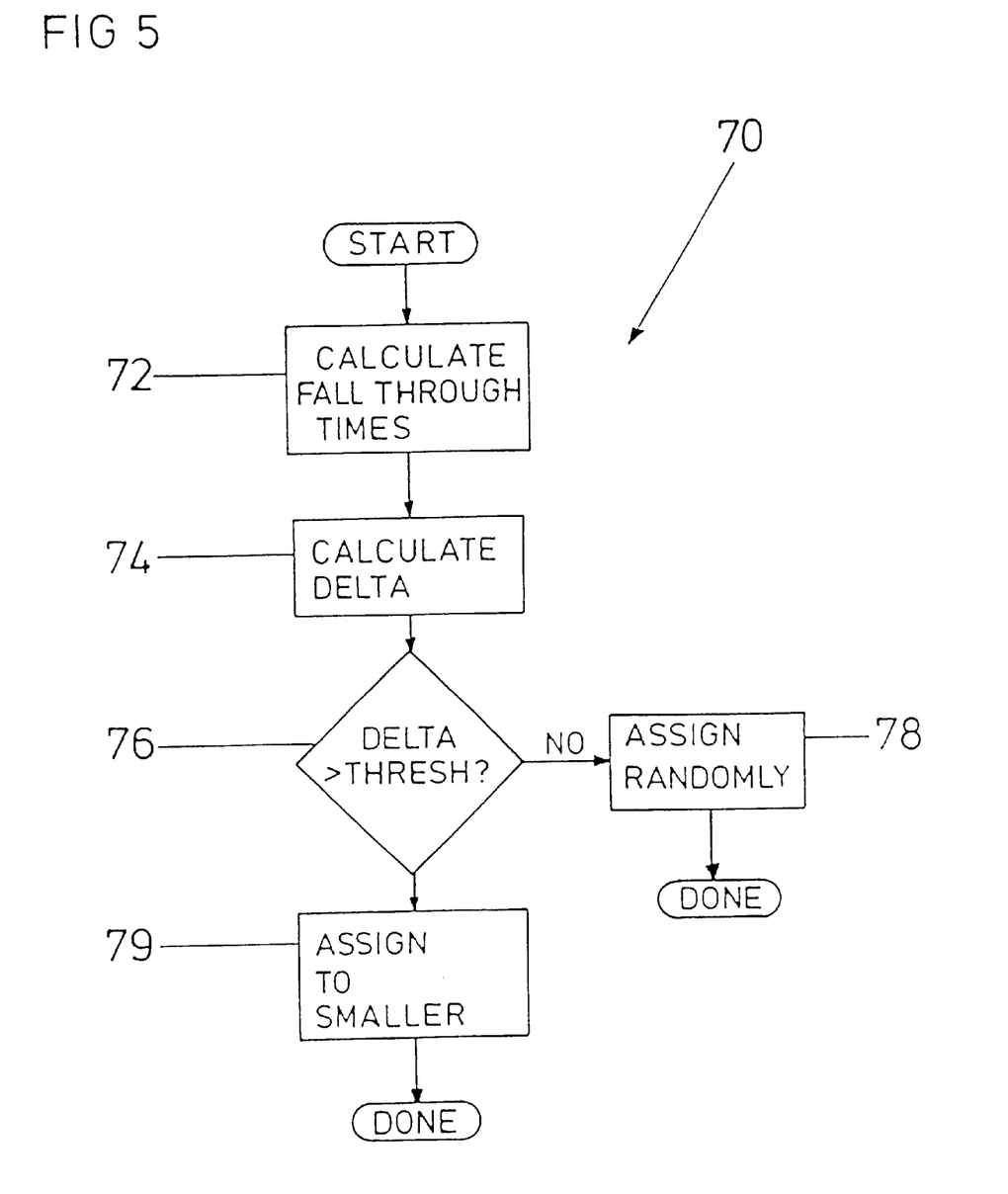
FIG. 5 is a flow chart that illustrates one technique for selecting an LRU for a block of data according to the present invention.

Referring to FIG. 5, a flow chart 70, illustrates steps for assigning a block to one of the LRUs 42, 44. At a first step 72, the fall through times for each of the LRUs 42, 44 is calculated. The fall through time may be determined by examining an amount of time that a block spends on the LRU, noting that the oldest block is discarded from the LRU when a new block is added. Each time a block is removed to make room for a new block, the fall through time may be determined by subtracting the time that the block is removed from the time that the block was added. Thus, an LRU with a particularly small fall through time may have a relatively small number of blocks stored thereon while an LRU with a relatively large fall through time may have a relatively large number of blocks assigned thereto.

Following step 72 is a step 74 where the difference between the fall through times of the LRUs 42, 44 is calculated. The difference is calculated by subtracting the fall through time of one of the LRU's 42,44 from the fall through time of another one of the LRU's 42, 44. Following the step 74 is a test step 76 where is determined if the delta value calculated at the step 74 is greater than a particular threshold. The threshold may be set to an absolute number or may be calculated as a percentage of either the greater or the lesser of the fall through time. The threshold value may be determined according to a few simple empirical observations and calculations, the performance of which is straight forward to one of ordinary skill in the art.

If it is determined at the test step 76 that the delta is not greater than a particular threshold, then control passes from the step 76 to step 78 where the block is randomly assigned to one of the LRUs 42, 44 in a manner analogous to that discussed above. Alternatively, if it is determined at the test step 76 that the value of the delta is greater than a particular threshold, then control passes from the test step 76 to step 79 where the new block is assigned to the LRU having the smaller fall through time.

Note that the system described herein may be implemented using any number of LRUs. As the number of LRUs is increased, the amount of time a block spends on an LRU may decrease. However, the number of collisions of processors waiting for access to the LRUs also decreases. Note also that data structures other than the doubly linked ring list may be used for each of the LRU's, provided that a mechanism exists to allow only one process at a time to modify the data structures thereof. Note also that the invention may be practiced with hardware other than that shown herein configured to operate in a manner different than that illustrated herein. The host interface units 22–24 may also control the cache 39.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of storing data in a cache memory, comprising:
   providing a first mechanism for allowing exclusive access to a first portion of the cache memory;
   providing a second mechanism for allowing exclusive access to a second portion of the cache memory, wherein exclusive access to the first portion is independent of exclusive access to the second portion; and
   assigning data to one of the first portion and the second portion according to a mechanism for balancing an amount of data in the portions.

2. A method, according to claim 1, further comprising:
   providing at least a third mechanism for allowing exclusive access to at least a third portion of the cache memory, wherein exclusive access to any one of the portions is independent of exclusive access to any other ones of the portions.

3. A method, according to claim 1, wherein the first and second mechanisms are locks.

4. A method, according to claim 3, wherein the locks are hardware locks.

5. A method, according to claim 3, wherein the locks are software locks.

6. A method, according to claim 1, further comprising:
   providing a first data structure in the first portion of the cache memory; and
   providing a second data structure in the second portion of the cache memory, wherein accessing the first portion includes accessing the first data structure and accessing the second portion includes accessing the second data structure.

7. A method, according to claim 6, wherein the data structures are doubly linked ring lists of blocks of data.

8. A method, according to claim 7, wherein each block of data corresponds to a track on a disk drive.

9. A method, according to claim 1, further comprising:
   determining a first cache fall through time for the first portion;
   determining a second cache fall through time for the second portion; and
   assigning data to one of the first and second portions according to the first and second cache fall through times.

10. A method, according to claim 9, further comprising:
    determining a difference between the first and second cache fall through times, wherein assigning data to one of the first and second portions is based on the difference.

11. A method, according to claim 10, wherein, in response to the difference being less than a predetermined amount, data is assigned randomly to one of the first and second portions.

12. A cache memory, comprising:
    a first portion having a first mechanism for allowing exclusive access thereto; and
    a second portion having a second mechanism for allowing exclusive access thereto, wherein exclusive access to said first portion is independent of exclusive access to said second portion, and wherein data is assigned to one of said portions to balance an amount of data in said portions.

13. A cache memory, according to claim 12, wherein said first and second mechanisms are software locks.

14. A cache memory, according to claim 12, wherein said first portion includes a first data structure and said second portion includes a second data structure and wherein accessing said first portion includes accessing said first data structure and accessing said second portion includes accessing said second data structure.

15. A cache memory, according to claim 14, wherein said data structures are doubly linked ring lists of blocks of data.

16. A cache memory, according to claim 15, wherein each block of data corresponds to a track on a disk drive.

17. A cache memory, according to claim 12, wherein a first cache fall through time for said first portion is determined, a second cache fall through time for said second portion is determined, and data ,is assigned to one of the first and second portions according to said first and second cache fall through times.

18. A cache memory, according to claim 17, wherein a difference between said first and second cache fall through times is determined and wherein assigning data to one of said first and second portions is based on said difference.

19. A cache memory, according to claim 18, wherein, in response to said difference being less than a predetermined amount, data is assigned randomly to one of said first and second portions.

20. A storage device, comprising:
    a plurality of disk drives;
    a plurality of disk interface units, each being coupled to one of said disk drives;
    a bus that interconnects said disk interface units; and
    a cache memory, coupled to said bus, said cache memory having a plurality of portions, each being independently controllable by one of said disk interface units, wherein data is assigned to one of said portions to balance an amount of data in said portions.

21. A storage device, according to claim 20, wherein each of said portions of said cache memory has a mechanism for controlling exclusive access thereto.

22. A storage device, according to claim 20, wherein each of said portions includes a data structure and accessing one of said portions includes accessing a corresponding one of said data structures.

23. A storage device, according to claim 22, wherein said data structures are doubly linked ring lists.

24. A cache memory, comprising:
a plurality of portions, wherein data is assigned to one of said portions to balance an amount of data in said portions; and
a plurality of locks, each of said locks corresponding to exclusive access to a particular one of said portions, wherein exclusive access to one of said portions is independent of exclusive access to an other one of said portions.

25. A cache memory, according to claim 24, wherein each of said portions includes a data structure and wherein accessing one of said portions includes accessing said data structure.

26. A cache memory, according to claim 25, wherein said data structure is a doubly linked ring lists of blocks of data.

27. A cache memory, according to claim 26, wherein each block of data corresponds to a track on a disk drive.

* * * * *